(12) United States Patent
Luft et al.

(10) Patent No.: US 11,739,825 B2
(45) Date of Patent: Aug. 29, 2023

(54) TRANSMISSION COMPRISING A HOUSING AND AN OIL DISTRIBUTION PART ARRANGED IN THE HOUSING

(71) Applicant: SEW-EURODRIVE GMBH & CO. KG, Bruchsal (DE)

(72) Inventors: Christian Luft, Ubstadt-Weiher (DE); Claus Kunik, Waghäusel (DE); Daniel Frank, Kraichtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 67 days.

(21) Appl. No.: 17/438,736

(22) PCT Filed: Feb. 20, 2020

(86) PCT No.: PCT/EP2020/025080
§ 371 (c)(1),
(2) Date: Sep. 13, 2021

(87) PCT Pub. No.: WO2020/182344
PCT Pub. Date: Sep. 17, 2020

(65) Prior Publication Data
US 2022/0145982 A1    May 12, 2022

(30) Foreign Application Priority Data
Mar. 12, 2019   (DE) .......................... 102019001709.9

(51) Int. Cl.
*F16H 57/04*       (2010.01)
(52) U.S. Cl.
CPC ..... *F16H 57/0423* (2013.01); *F16H 57/0457* (2013.01); *F16H 57/0471* (2013.01); *F16H 57/0408* (2013.01); *F16H 57/0495* (2013.01)

(58) Field of Classification Search
CPC ............ F16H 57/0423; F16H 57/0457; F16H 57/0471; F16H 57/0495
See application file for complete search history.

(56) References Cited

U.S. PATENT DOCUMENTS 2,536,385 A    1/1951  Miller
3,529,698 A    9/1970  Nelson
(Continued)

FOREIGN PATENT DOCUMENTS

CN   101463896 A   6/2009
CN   205089955 U   3/2016
(Continued)

OTHER PUBLICATIONS

International Search Report issued in corresponding International Application No. PCT/EP2020/025080, dated Apr. 21, 2020, pp. 1-2, English Translation.
(Continued)

*Primary Examiner* — Minh Truong
(74) *Attorney, Agent, or Firm* — Carter, Deluca & Farrell LLP

(57) ABSTRACT

A transmission includes a housing and a distributor part to which lubricating oil is able to be applied through a recess in the housing, e.g., in a housing part of the housing or in a cover part of the housing. The distributor part includes a collection region and feeder channels, which are connected to the collection region and are able to convey lubricating oil to bearings of the transmission.

21 Claims, 3 Drawing Sheets

(56) References Cited

U.S. PATENT DOCUMENTS

| | | | | |
|---|---|---|---|---|
| 4,175,643 A * | 11/1979 | Jenkins | ............... | F16H 57/0457 |
| | | | | 184/6.12 |
| 9,581,236 B2 * | 2/2017 | Tage | ................... | F16H 57/0431 |
| 2003/0000337 A1 * | 1/2003 | Camping | ............ | F16H 57/0483 |
| | | | | 74/655 |
| 2006/0231337 A1 * | 10/2006 | Vogeltanz | ................ | F16N 7/36 |
| | | | | 184/6 |
| 2013/0283955 A1 | 10/2013 | Kenichi et al. | | |
| 2016/0273646 A1 * | 9/2016 | Wu | ..................... | F16H 57/0423 |

FOREIGN PATENT DOCUMENTS

| | | | | |
|---|---|---|---|---|
| CN | 112065969 A * | 12/2020 | ......... | F16H 57/0421 |
| DE | 102012215355 A1 | 3/2013 | | |
| DE | 102021206607 B3 * | 10/2022 | ......... | F16H 57/0423 |
| EP | 2148114 A1 | 1/2010 | | |
| GB | 1115446 A | 5/1968 | | |
| JP | H04277360 A | 10/1992 | | |
| JP | H09100899 A * | 4/1997 | ......... | F16H 57/0471 |
| WO | 2014108250 A1 | 7/2014 | | |
| WO | 2018100259 A1 | 6/2018 | | |

OTHER PUBLICATIONS

International Preliminary Report on Patentability issued in corresponding International Application No. PCT/EP2020/025080, dated Aug. 25, 2020, pp. 1-11, English Translation.

* cited by examiner

TRANSMISSION COMPRISING A HOUSING AND AN OIL DISTRIBUTION PART ARRANGED IN THE HOUSING

FIELD OF THE INVENTION

The present invention relates to a transmission comprising a housing.

BACKGROUND INFORMATION

In certain conventional systems, a transmission has lubricating oil within its housing. However, heat loss occurs when rotating toothed parts of the transmission move the lubricating oil around.

SUMMARY

Example embodiments of the present invention provide for efficient use of lubricating oil.

According to an example embodiment of the present invention, a transmission includes a housing and a distributor part to which lubricating oil is able to be applied through a recess in the housing, e.g., in a housing part of the housing or in a cover part of the housing. The distributor part has a collection region and feeder channels, which are connected to the collection region and are able to convey lubricating oil to bearings of the transmission.

This has the advantage that an efficient use of the lubricating oil is achievable, that is to say, a minimum of lubricating oil is required in the transmission yet adequate lubrication is achievable nevertheless, e.g., at an oil level that is permanently as low as possible. This makes it possible to reduce the losses. According to example embodiments, the lubricating oil is filled into the transmission through the recess. During the filling process, the lubricating oil is guided along the baffle plate to a collection region, from where it is conveyed to the provided lubrication points which supply bearings of the transmission with lubricating oil.

It is therefore possible to undertake the filling of the lubricating oil when the transmission is taken into operation.

According to example embodiments, a baffle plate is situated between the recess and the collection region, e.g., the planar baffle plate is situated in a plane that intersects the recess, e.g., bisects it, e.g., such that lubricating oil filled into the transmission through the recess flows into the collection region along both sides of the baffle plate. This offers the advantage that lubricating oil spun off during the operation at high temperatures is captured and routed into the collection region where it will then be used.

According to example embodiments, the baffle plate is fixed in place on a holding plate with the aid of a height adjustment, the holding plate being fastened to the housing of the transmission, e.g., to the cover part of the housing, especially with the aid of fastening screws. This is considered advantageous insofar as the distributor part is adaptable to the diameter of the respective selected gear wheel.

According to example embodiments, the height adjustment has a plurality of holes provided in the baffle plate and a fixation element that projects through one of the holes. The holes are situated at different distances from the cover part, the fixation element, for example, projecting through a hole that extends through the holding plate. This has the advantage of achieving an uncomplicated connection between the baffle plate and the holding plate, and a height adjustment is provided.

According to example embodiments, the distributor part is connected to the baffle plate, e.g., firmly connected, for example, in an integral fashion. This is considered advantageous insofar as the distributor part is supportable by the baffle plate, which is able to supported by the holding plate, which is supported by the cover part. In addition, the oil draining along the baffle plate is selectively guidable into the collection region and from there, via the feeder channels, to the lubricating points, e.g., bearings.

According to example embodiments, the recess is able to be sealed by a sealing part, e.g., by a sealing screw. This has the advantage that the interior space interacts with the environment only during a startup operation.

According to example embodiments, the planar baffle plate is situated in a plane that is aligned in parallel with the axis of rotation of the gear wheel, e.g., such that—depending on the direction of rotation of the gear wheel—lubricating oil spun off by the gear wheel bounces against a respective side of the baffle plate. This has the advantage that when the lubricating oil is filled in, a first portion flows down the front side of the baffle plate and a second portion flows down the rear side of the baffle plate and into the collection region. As a result, a certain guidance of the lubricating oil flowing in through the recess is achievable.

According to example embodiments, the baffle plate is connected in the collection region to the distributor part, e.g., the collection region, especially by welding. This has the advantage that the distributor part is held via the baffle plate.

According to example embodiments, the collection region is arranged in the shape of a trough and/or has a side wall of this type, and the distributor part, e.g., the collection region, is situated so close to the gear wheel that the lubricating oil carried along by the gear wheel during its rotary motion, e.g., at a first temperature, collects at such a height on the side wall that lubricating oil flows over the side wall into the collection region. This has the advantage that the side wall acts as a scraper when the oil is cold.

According to example embodiments, at a second temperature, which is higher than the first temperature, no lubricating oil collects on the side wall at such a height that it flows over the side wall into the collection region, the lubricating oil, for example, having a greater viscosity at the first temperature than at the second temperature. This is considered advantageous insofar as warm lubricating oil does not form a thick oil film around the rotating gear wheel but is spun off in the direction of the baffle plate.

According to example embodiments, the side wall is aligned in parallel with the axis of rotation of the gear wheel. This offers the advantage that the side wall functions as a scraper which is directed transversely to the tooth system of the gear wheel.

Further features and aspects of example embodiments of the present invention are described in greater detail below with reference to the appended schematic Figures.

DETAILED DESCRIPTION

Figure 1:
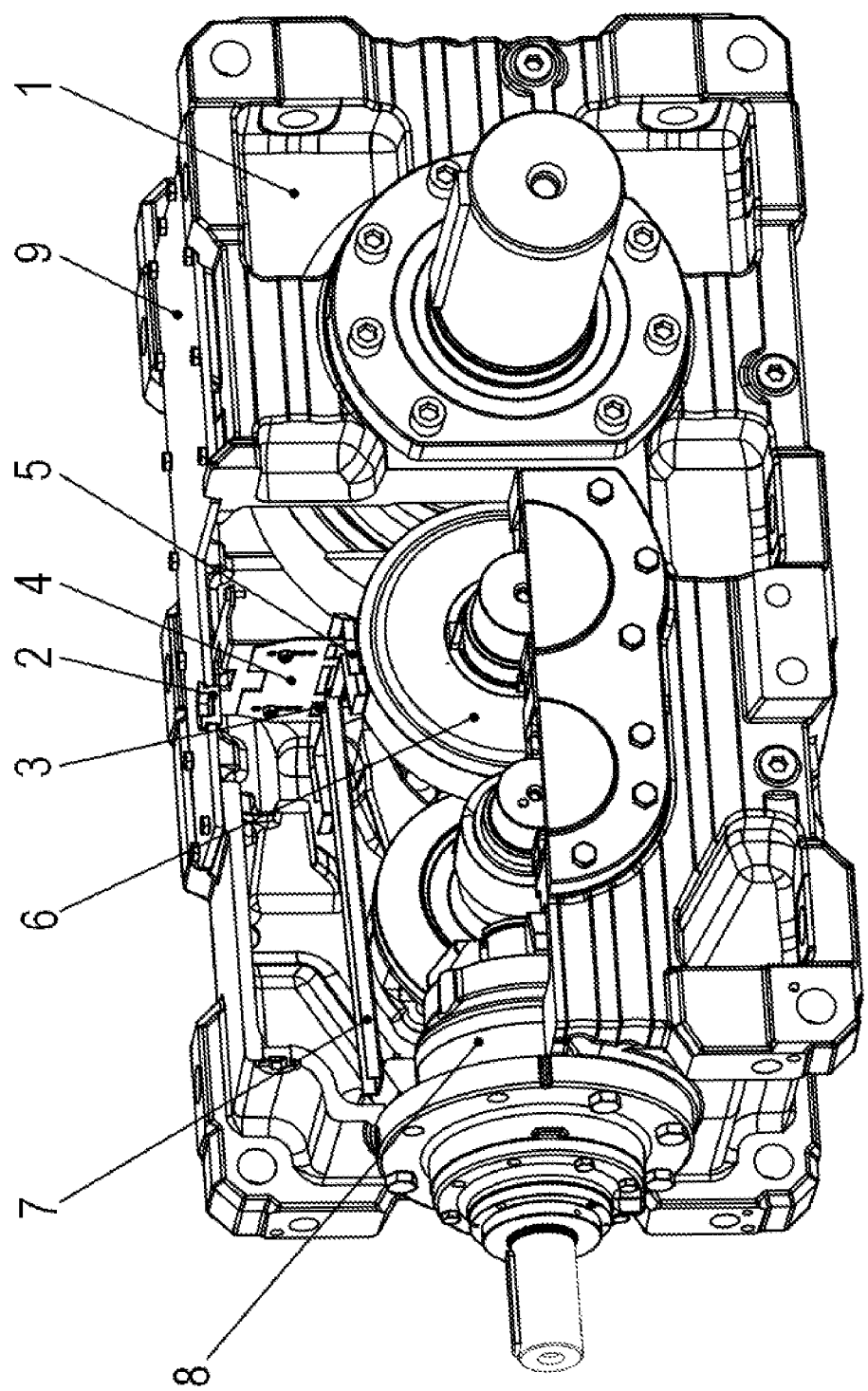
FIG. 1 is a partial cross-sectional view of a transmission having an oil feed according to an example embodiment of the present invention.
Figure 2:
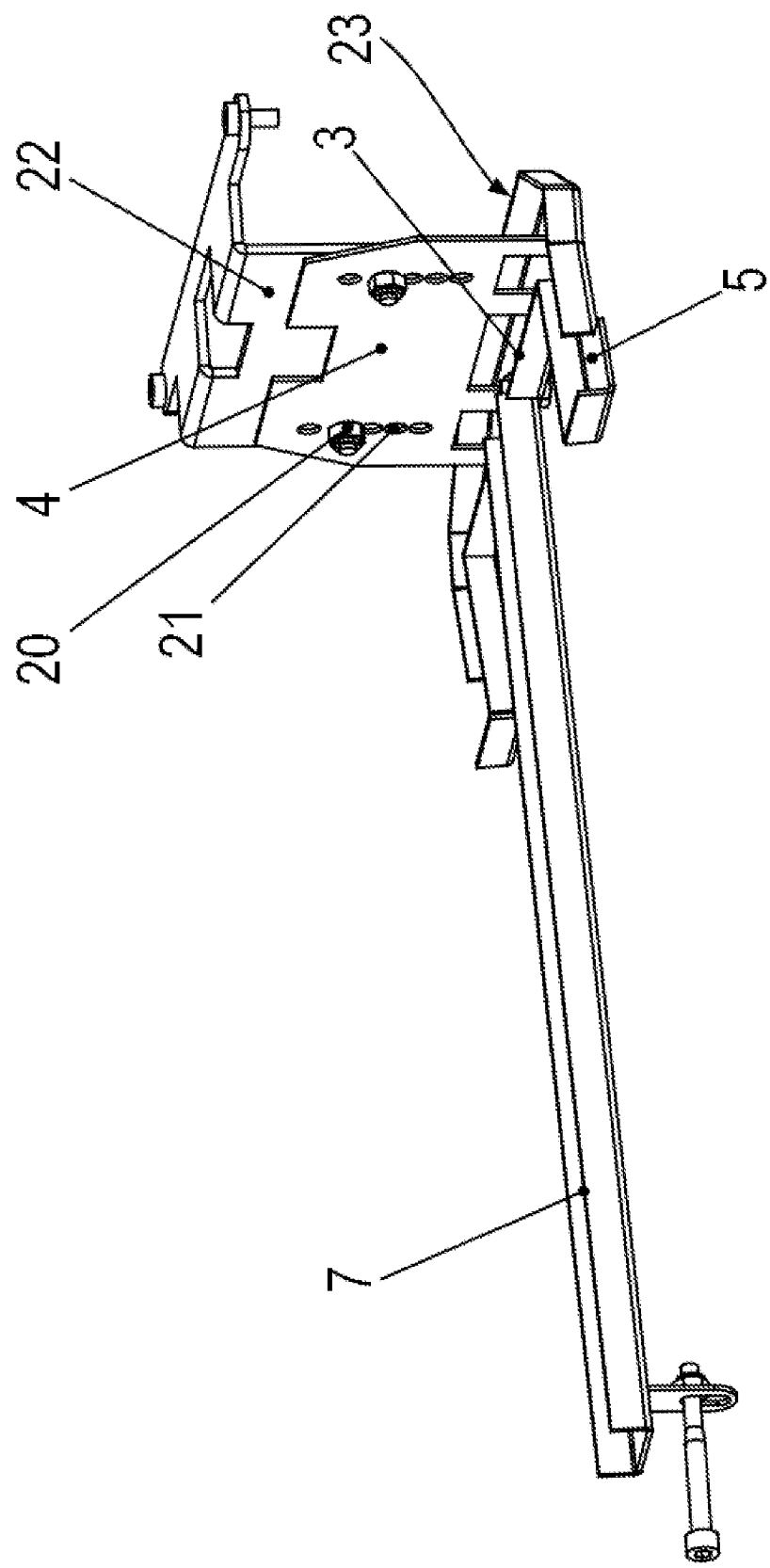
FIG. 2 is a perspective view of the oil feed from a first viewing direction.
Figure 3:
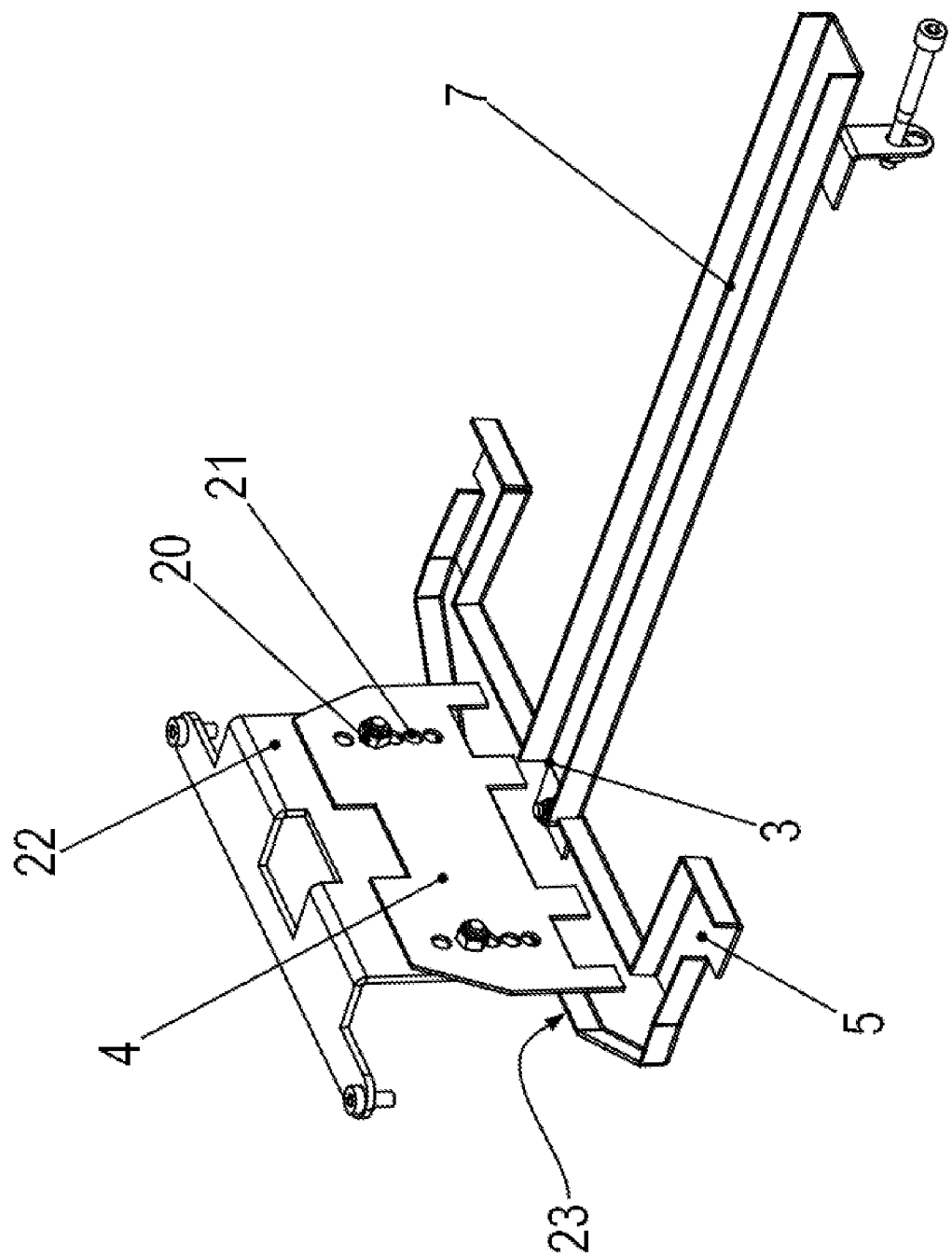
FIG. 3 is a perspective view of the oil feed from a different viewing direction.

As schematically illustrated in the Figures, the transmission has gear wheels 6 which are connected to shafts in a torsionally fixed manner, the shafts being rotatably supported by bearings that are accommodated in a housing part 1.

Although the transmission is partially filled with lubricating oil, the lubricating oil quantity is so low that only the tooth system of the largest gear wheel dips into the oil sump.

During the startup operation, the transmission is filled with oil in order to ensure an oil supply as required during the operation.

This is accomplished by removing a sealing plug 2 which is able to close a recess in a cover part 9. During the startup operation, the lubricating oil is thus poured through the recess into the interior space region.

A holding plate 22 of the oil feed is fastened to the inner side of cover part 9. A baffle plate 4 is fixed in place on holding plate 22 in a manner that allows for a height adjustment.

The height adjustment is provided by a hole grid, e.g., a row of holes, in baffle plate 4, and a fixation element 20, e.g., a screw with a nut, fixes baffle plate 4 in place. Fixation element 20 projects through the selected hole. Using the nut screwed onto the screw of fixation element 20, baffle plate 4 is pressed against holding plate 22, which is thereby pressed against the screw head of the screw of fixation element 20. In this manner, baffle plate 4 is clamped against holding plate 22 and secured in a form-fitting manner with the aid of the fixation element that passes through baffle plate 4.

Baffle plate 4 is connected to a distributor part at its end region facing away from holding plate 22, e.g., by welding. The distributor part includes a collection region 3, which catches the oil flowing down on both sides on baffle plate 4 when the oil is filled in through the recess.

The captured oil is guided into feeder channels 5 and 7 which directly or indirectly guide the oil to bearings of rotatably supported toothed parts. For instance, bearing channel 5 leads to a housing pocket formed in housing part 1, from where the oil is guided through bores to bearings accommodated in housing part 1. In addition, feeder channel 7 guides oil to bearings of the input shaft, for example.

During an operation, sealing plug 2 is plugged into the recess so that cover part 9 is sealed again.

Collection region 3 of the distributor part is surrounded by a side wall 23, which may, for example, be produced as a tab region bent upwards. The height of this side wall 23 is so low and the distributor part, e.g., collection region 3, is situated so close to gear wheel 6 that oil carried along by gear wheel 6 during the rotary motion is scraped off at side wall 23, in particular at the start of the operation when the temperatures are still low, and the oil is thus scraped off into the distributor part and/or flows into it.

This is because the oil is highly viscous at low temperatures. For this reason, the oil film pulled out of the oil sump by rotating gear wheel 6 and carried along is so thick that side wall 23 inflates the oil film to such an extent that oil even flows over side wall 23 into collection region 3. Side wall 23 therefore acts as a scraper when the oil is cold. The distance between the distributor part, e.g., side wall 23, and the head circle of the tooth system of gear wheel 6 is arranged proportionally small.

When the oil becomes warmer during the operation, the thickness of the oil film carried along decreases and side wall 23 no longer acts as a scraper or does so to only a limited extent. However, the oil carried along by gear wheel 6 is spun off by gear wheel 6 during the rotary motion. Baffle plate 4 then catches a portion of the oil spun off by gear wheel 6 during its rotary motion and guides this recovered oil into collection region 3, from where the oil is then conveyed via the feeder channels (5, 7) to the points of the transmission to be supplied with oil.

Web regions, which project toward the distributor part and are set apart from one another and arranged as spacer regions, are formed on baffle plate 4. The web regions project into the collection region and/or support baffle plate 4 at collection region 3, the web regions, for example, setting baffle plate 4 apart from the distributor part having collection channel 3.

In further exemplary embodiments, sealing plug 2 is arranged as a sealing screw, which is screwed into a thread of the cover part.

LIST OF REFERENCE NUMERALS

1 housing part
2 sealing plug
3 collection region
4 baffle plate
5 feeder channel
6 gear wheel
7 feeder channel
8 bearing of the input shaft
9 cover part
20 fixation element, e.g., screw with nut
21 uninterrupted recesses, e.g., hole grid
22 holding plate
23 side wall of collection region 3

The invention claimed is:

1. A transmission, comprising:
   a housing including a recess; and
   a distributor part arranged in the housing and to which lubricating oil is applicable through the recess of the housing, the distributor part including a collection region and feeder channels connected to the collection region, the feeder channels adapted to convey the lubricating oil to bearings of the transmission;
   wherein a baffle plate is arranged between the recess and the collection region; and
   wherein the baffle plate is height-adjustably fixed in place on a holding plate that is fastened to the housing of the transmission.

2. The transmission according to claim 1, wherein the recess is provided in a housing part of the housing.

3. The transmission according to claim 1, wherein the recess is provided in a cover part of the housing.

4. The transmission according to claim 1, wherein the baffle plate is arranged as a planar baffle plate and is arranged in a plane that intersects the recess.

5. The transmission according to claim 4, wherein the transmission is configured so that the lubricating oil filled into the transmission through the recess flows into the collection region along both sides of the baffle plate.

6. The transmission according to claim 1, wherein the baffle plate is arranged as a planar baffle plate and is arranged in a plane that bisects the recess.

7. The transmission according to claim 1, wherein the holding plate is fastened to a cover part of the housing.

8. The transmission according to claim 7, wherein the holding plate is screw-fastened to the cover part of the housing with fastening screws.

9. The transmission according to claim 7, wherein the baffle plate includes a plurality of holes to height-adjustably fix the baffle plate on the holding plate and a fixation element that projects through one of the holes, the holes being arranged at different distances from the cover part.

10. The transmission according to claim 9, wherein the fixation element projects through a hole that extends through the holding plate.

11. The transmission according to claim 1, wherein the baffle plate includes web regions that project toward the distributor part and are set apart from one another.

12. The transmission according to claim 11, wherein the web regions project into the collection region and/or support the baffle plate at the collection region, the baffle plate being set apart from the distributor part by the web regions.

13. The transmission according to claim 1, wherein the distributor part is connected to, firmly connected to, and/or integrally connected to the baffle plate.

14. The transmission according to claim 1, wherein the recess is adapted to be sealed by a sealing part and/or a sealing screw.

15. The transmission according to claim 1, wherein the baffle plate is arranged as a planar baffle plate and is arranged in a plane that is aligned in parallel with an axis of rotation of a gear wheel of the transmission.

16. The transmission according to claim 15, wherein the baffle plate is configured such that, depending on a direction of rotation of the gear wheel, lubricating oil spun off by the gear wheel bounces against a respective side of the baffle plate.

17. The transmission according to claim 1, wherein the baffle plate is connected in and/or welded to the collection region to the distributor part.

18. The transmission according to claim 1, wherein the collection region is trough shaped and/or includes a trough-shaped side wall, and the distributor part and/or the collection region is arranged in proximity to a gear wheel of the transmission that the lubricating oil carried along by the gear wheel during rotary motion, at a first temperature, collects at a height on the side wall that the lubricating oil flows over the side wall into the collection region.

19. The transmission according to claim 18, wherein, at a second temperature, which is higher than the first temperature, no lubricating oil collects on the side wall at a height that the lubricating oil flows over the side wall into the collection region.

20. The transmission according to claim 19, wherein the lubricating oil has a greater viscosity at the first temperature than at the second temperature.

21. The transmission according to claim 18, wherein the side wall is aligned in parallel with an axis of rotation of the gear wheel.

* * * * *